UNITED STATES PATENT OFFICE.

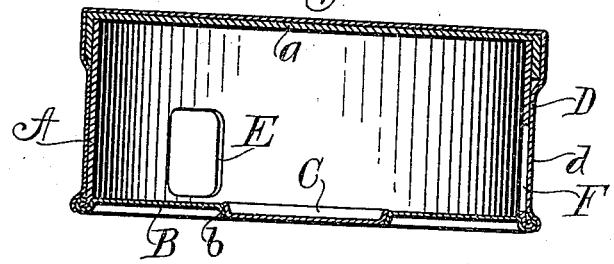
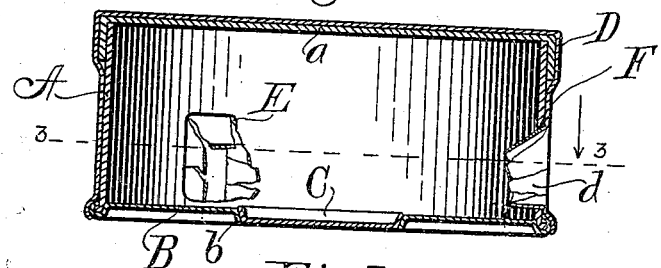
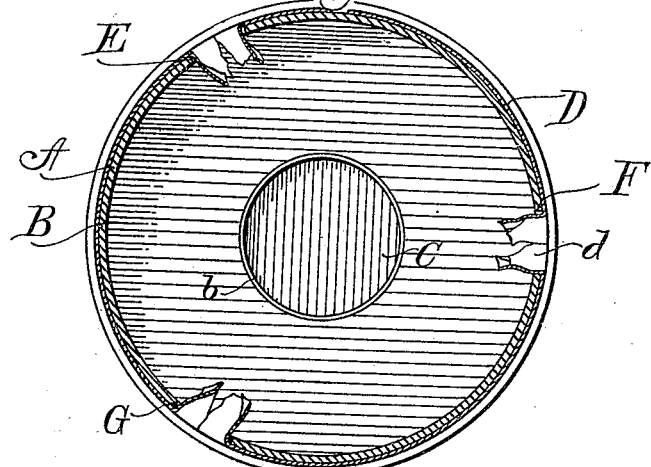

REINHOLD G. KOCH, OF NEW YORK, N. Y.

INSECT-TRAP.

1,394,626.  Specification of Letters Patent.  Patented Oct. 25, 1921.

Application filed April 29, 1920. Serial No. 377,597.

*To all whom it may concern:*

Be it known that I, REINHOLD G. KOCH, citizen of the United States, residing at New York, in the county of New York and State of New York, have invented certain new and useful Improvements in Insect-Traps, of which the following is a specification.

This invention relates to insect traps, and is intended more particularly to attract and imprison crawling insects such as waterbugs and roaches.

The object of the invention is the production of a trap for insects that may be placed in almost any situation either on the floor of a room or upon pantry or other shelves, and which is constructed of parts having special formation and arrangement, whereby the traps made in accordance with this invention may be shipped already baited, and quickly made ready for service by breaking inwardly the frangible layer of material covering the wall of the box, and certain openings in the wall of the box, as more fully explained herein-below.

The special construction and disposition of the parts of this invention are illustrated in the accompanying drawings, of which Figure 1 represents a vertical section of a trap box made in accordance with this invention. Fig. 2 is a like section to the first figure, but shows the frangible material with which the wall of the box and certain openings therein are covered, broken inwardly to admit the crawling insects into the box and to render their escape therefrom difficult. Fig. 3 is a horizontal section upon the broken line 3—3 of Fig. 2.

Throughout the drawings and description the same letter is used to refer to the same part.

Considering the drawings, The box A, which may be of any selected material, has the removable top $a$, and a fixed bottom B provided centrally with the downwardly flanged opening $b$ seating the removable bait pan C.

The vertical wall of the box A, as well as the rim of the top $a$, and the openings E, F and G through the wall of the box near the bottom B, are covered with an external layer of frangible material D.

As shown in Fig. 1 the frangible outer layer D is intact, and it will be noted that the box is to all intents and purposes sealed, as the material D is attached to the wall and top and extends over the openings in the wall of the box. It is believed to be clear that if the bait is placed in the pan C before the top $a$ is put on, and before the sealing layer of material D has been applied, the top may be put on and the exterior sealed by the application of the layer D, whereupon the box A is ready for shipment already baited.

To operate the invention, that is to say to set the trap or render it available for catching insects, that portion of the outer layer D, such as the portion $d$ over the opening F is broken inwardly by the end of some blunt instrument. The blunt end of a lead pencil may be used or any article handy, the object being to produce inwardly-extending more or less irregular portions of the broken material, and to have such portions slightly convergently arranged substantially as illustrated in Fig. 2. The insects attracted by the bait, which may be compounded of substances fatal to them but harmless to human beings, pass into the box A through the broken coverings of the openings E, F and G. But, once an insect is in the box, even if not overcome by the bait, it finds the greatest difficulty in escaping through the convergent fragments of the inwardly broken portion $d$ of the outer layer D. It is believed to have been shown by the foregoing explanation that this invention may be produced for shipment already baited, and quickly rendered ready to capture the insects.

Having now described this invention, and explained the mode of its operation, what I claim is:—

An insect trap, comprising a box provided with a plurality of spaced openings in its wall, each of the said openings having applied thereto a piece of material, and the said material being punched or broken inwardly with respect to the box whereby each opening is provided with converging irregular shaped portions of the broken material allowing an insect to enter but preventing its exit.

In testimony whereof I affix my signature.

REINHOLD G. KOCH.